(12) United States Patent
Fuller (10) Patent No.: US 9,494,925 B2
(45) Date of Patent: Nov. 15, 2016

(54) HYBRID CONTROL SYSTEM

(75) Inventor: James W. Fuller, Amston, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1021 days.

(21) Appl. No.: 13/331,844

(22) Filed: Dec. 20, 2011

(65) Prior Publication Data

US 2013/0158680 A1 Jun. 20, 2013

(51) Int. Cl.
| | |
|---|---|
| G05B 11/01 | (2006.01) |
| G05B 13/02 | (2006.01) |
| G05B 13/04 | (2006.01) |

(52) U.S. Cl.
CPC ... *G05B 13/048* (2013.01); *G05B 2219/42017* (2013.01)

(58) Field of Classification Search
CPC .................. G05B 13/048; G05B 2219/42017; G05B 13/04; B64C 19/00; G06N 7/00
USPC .............................. 700/19–20, 28, 32, 44–45
See application file for complete search history.

(56) References Cited

U.S. PATENT DOCUMENTS

| | | | | |
|---|---|---|---|---|
| 6,092,919 | A * | 7/2000 | Calise ................. | G05D 1/0825 244/194 |
| 6,618,631 | B1 * | 9/2003 | Johnson ............... | G05B 13/027 700/173 |
| 6,882,889 | B2 * | 4/2005 | Fuller et al. ..................... | 700/44 |
| 7,152,023 | B2 * | 12/2006 | Das ....................... | G05B 13/048 700/30 |
| 7,218,973 | B2 * | 5/2007 | Johnson ............... | G05B 13/027 700/28 |
| 7,363,094 | B2 * | 4/2008 | Kumar ............................ | 700/29 |
| 8,145,329 | B2 * | 3/2012 | Pekar et al. .................... | 700/45 |
| 8,185,255 | B2 * | 5/2012 | Lavretsky ............ | G05D 1/0825 244/75.1 |
| 8,285,659 | B1 * | 10/2012 | Kulkarni ................ | G05B 17/02 244/76 R |
| 8,682,454 | B2 * | 3/2014 | Fuller et al. .................... | 700/45 |
| 8,761,966 | B2 * | 6/2014 | Zhu ......................... | G05D 1/101 244/175 |
| 2009/0281641 | A1 | 11/2009 | Fuller | |
| 2012/0060505 | A1 | 3/2012 | Fuller et al. | |
| 2012/0095621 | A1 * | 4/2012 | Zhu et al. ........................ | 701/3 |
| 2012/0221156 | A1 * | 8/2012 | Fuller et al. .................. | 700/287 |
| 2013/0206899 | A1 * | 8/2013 | Sahasrabudhe ...... | G05D 1/0858 244/17.13 |

FOREIGN PATENT DOCUMENTS

| | | |
|---|---|---|
| EP | 1434116 A2 | 6/2004 |
| EP | 1950636 A1 | 7/2008 |
| EP | 2267559 A2 | 12/2010 |

OTHER PUBLICATIONS

Combined Feedback Linearization and Constrained Model Predictive Control for Entry Flight; by Soest et al.; Journal of Guidance, Control, and Dynamics; vol. 29, No. 2, Mar.-Apr. 2006; 8 pages.*

(Continued)

*Primary Examiner* — Ronald Hartman, Jr.
(74) *Attorney, Agent, or Firm* — Cantor Colburn LLP (57) ABSTRACT

A hybrid control system and a method for predicting a behavior of a physical system using the hybrid control system is disclosed. The hybrid control system may include a model inverting control system capable of implementing a model inverting control law and determining an active set of goals and limits and a model predictive control system capable of implementing a model predictive control law and utilizing the active set of goals and limits to determine current effector requests, the current effector requests being used to control behavior of the physical system.

20 Claims, 3 Drawing Sheets

(56) References Cited

OTHER PUBLICATIONS

Fault Tolerant Control Using Dynamic Inversion and Model Predictive Control applied to an Aerospace Benchmark; Joosten et al.; Proceedings of the 17th World Congress, The International Federation of Automatic Control; Seoul, Korea, Jul. 6-11, 2008; 6 pages.*

Model Predictive Control and Dynamic Inversion for Unmanned Aerial Vehicle; Cheng et al.; 5th IFAC/EURON Symposium on Intelligent Autonomous Vehicles, Instituto Superior Technico, Lisboa, Purtugal, Jul. 5-7, 2004; 6 pages.*

Nonlinear Dynamic Inversion Baseline Control Law: Flight-Test Results for the Full-scale Advanced Systems Testbed F/A-18 Airplane; by Christopher J Miller; NASA Dryden Flight Research Center; American Institute of Aeronautics and Astronautics; 45 pages; Jul. 20, 2011.*

Helicopter Nonlinear Flight Control using Incremental Nonlinear Dynamic Inversion; by Pedro Valerio Menino Simplicio; Oct. 2011; 124 pages.*

Fault-tolerant control using dynamic inversion and model-predictive control applied to an aerospace benchmark; by Joosten et al.; Proceedings of the 17th World Congress, The International Federation of Automatic Control, Seoul, Korea, Jul. 6-11, 2008; 6 pages.*

Joosten, et al; "*Fault-tolerant control using dynamic inversion and model-predictive control applied to an aerospace benchmark*"; article; Jul. 2008; pp. 12030-12035; Seoul, Korea.

International Search Report and Written Opinion for related International Application No. PCT/US12/70995; report dated Jun. 11, 2013.

Enns, D., et al., "Dynamic Inversion: An Evolving Methodology for Flight Control Design", Flight Mechanics Symposium, Turin, Italy, May 9-13, 1994, AGARD Conference Proceedings 560, North Atlantic Treaty Organization, Jan. 1995, 12 pages.

Hovakimyan, N., et al., "L1 Adaptive Control Theory: Guaranteed Robustness with Fast Adaptation", IEEE Control Systems, vol. 31, Issue 5, IEEE, Oct. 2011, pp. 112-114.

Morton, B., et al., Stability of Dynamic Inversion Control Laws Applied to Nonlinear Aircraft Pitch-Axis Models, IMA Preprint Series # 1245, Jul. 1994, Institute for Mathematics and Its Applications, University of Minnesota, Minneapolis, MN, 33 pages.

Rao, C.V., et al., "Application of Interior-Point Methods to Model Predictive Control", Journal of Optimization Theory and Applications: vol. 99, No. 3, Plenum Publishing Corporation, Dec. 1998, pp. 723-757.

* cited by examiner

HYBRID CONTROL SYSTEM

TECHNICAL FIELD OF THE DISCLOSURE

The present disclosure relates to control systems and, more particularly, relates to model predictive and model inverting control systems.

BACKGROUND OF THE DISCLOSURE

Computer implemented control laws are widely employed in physical systems, such as, aircraft engines, turbines, chemical plants, oil refineries, etc., for controlling and predicting behavior of those systems, often in real time. Three types of control laws are frequently employed, namely, model inverting control laws, model predictive control laws and linear quadratic Gaussian control laws. While all of the aforementioned control laws are multivariable control laws capable of decoupling responses of naturally cross coupled systems, where effector (e.g., means for adjusting or manipulating control variables, such as, thrust) changes simultaneously affect multiple goals (or outputs), several key differences between the three control laws exist. To facilitate a proper understanding of this disclosure, each of the three control laws is briefly discussed below.

With respect to model inverting control (MIC) laws, they may include constrained dynamic inversion (CDI), dynamic inversion (DI), backstepping, and feedback linearization control laws to design and implement desired controlled system responses to commands as an analytical model. CDI determines the current effector requests and make a second model match the desired output in one next time step. The CDI presumes that both the dynamics of the physical system (e.g., the engine) to be controlled and the desired response dynamics (e.g., outputs) are known in the form of analytical models. CDI also presumes that limits (e.g., physical limits of the physical system that must be observed) are given, and that the desired feedback properties are specified. CDI's objective is to make goal variables track the desired response while holding all limits. This type of control law has several advantages. CDI can handle actuator limits and general output limits, for example, a maximum safe internal temperature. The key disadvantage of model inverting control laws is that they are unstable if they are working with active goals and limits for which the plant dynamics are either unstable or non minimum phase (NMP). NMP is a type of dynamic response in the frequency domain where multivariable system dynamics can be represented by matrices of transfer functions, which may be analyzed in terms of their poles and transmission zeros. Poles represent the modes of the dynamic response and may be stable or unstable. NMP systems have transmission zeros that would be unstable if they were poles. CDI is also sensitive to model errors. Furthermore, CDI predicts signals at only one future controller update (e.g., one time step ahead) and thus, requires that the system be controllable in one step.

Model predictive control (MPC), on the other hand, is similar to CDI but with some key differences. For example, whereas CDI determines effector settings based on prediction optimization including only one future controller update (e.g., one time step ahead), MPC bases effector settings on an optimization spanning N prediction steps ahead, where N is greater than one. This affects the control law function and implementation. Functionally, MPC is more robust than CDI, more tolerant of model errors and requires N step controllability, rather than 1 step. Furthermore, if N is large enough, then MPC may stabilize an unstable system and may be robust to NMP dynamics as well. This robustness can be exploited for a number of benefits. First it allows the model to be adaptive. An adaptive model can more accurately predict behavior of the physical system, accommodating for manufacturing variations, wear and aging, and even damage. Also, the risk of adding, removing, or modifying goals and limits is reduced with MPC. In CDI, any of these changes may change the system from MP to NMP. Thus, MPC is attractive in that it can better tolerate non-minimum phase dynamics and unstable modes, does not require 1-step controllability and can hold all limits. MPC control laws are also less sensitive to model errors and variations than are CDI control laws as mentioned above.

However, MPC implementation requires substantially more computation than CDI. If the most computationally efficient methods are used, then MPC may require approximately 2N to 5N times more operations than CDI, where N may vary from 10 to 100. This large amount of computation makes MPC unsuitable for control of systems that require frequent updates (e.g., about every 25 milliseconds or so).

A third type of control law known as the linear quadratic Gaussian control or LQG is similar to MPC except that it cannot hold limits. The advantage of LQG is that it typically has good feedback stability margins, automatically tolerates model errors, NMP dynamics and unstable modes, and is computationally simple. If N is large enough in an MPC controller, its robustness approaches that of the LQG control, but adds a limit holding capability.

All three control design methods described above are frequently combined with an estimator (such as, a Kalman filter, an asymptotic observer, a model tuner, etc.) in a design technique well known as loop transfer function recovery and the estimator may be designed to obtain the desired feedback properties.

Thus, it can be seen that each of the control laws described above has certain advantages and disadvantages. It would be beneficial if a control law could be developed that combined the advantages of the three control laws, while at least substantially circumventing the disadvantages of those laws. Specifically, it would be beneficial if a control law that provided the loop transfer function recovery, robustness, NMP tolerance, and unstable mode tolerance of the LQG controller and the limit holding capability of the CDI and MPC laws, with a considerably smaller computational burden than the MPC law could be developed.

SUMMARY OF THE DISCLOSURE

In accordance with one aspect of the present disclosure, a hybrid control system for predicting a behavior of a physical system is disclosed. The hybrid control system may include a model inverting control system capable of implementing a model inverting control law and determining an active set of goals and limits and a model predictive control system capable of implementing a model predictive control law and utilizing the active set of goals and limits to determine current effector requests, the current effector requests being used to control behavior of the physical system.

In accordance with another aspect of the present disclosure, a method for predicting behavior of a physical system is disclosed. The method may include providing a hybrid control system having (a) a model inverting control system capable of implementing a model inverting control law; and (b) a model predictive control system capable of implementing a model predictive control law. The method may also include receiving one or more commands and limits as inputs and determining by the model inverting control system an active set of goals and limits based upon the one or more commands and limits. The method may further include inputting the active set of goals and limits along with the one or more commands and limits into the model predictive control system and computing current effector requests based upon the active set of goals and limits for controlling behavior of the physical system.

In accordance with yet another aspect of the present disclosure, a hybrid control system is disclosed. The hybrid control system may include a model inverting control system capable of receiving one or more commands and limits and generating an active set of limits and goals, a model predictive control system capable of receiving the one or more commands and limits and the active set of goals and limits to generate current effector requests in a single iteration and an actuator servo loop capable of converting the current effector requests into actuator commands. The hybrid control system may further include one or more actuators capable of receiving the actuator commands and controlling a behavior of a physical system and an estimator capable of providing feedback to the model predictive control system and the model inverting control system.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION OF THE DISCLOSURE

Figure 1:
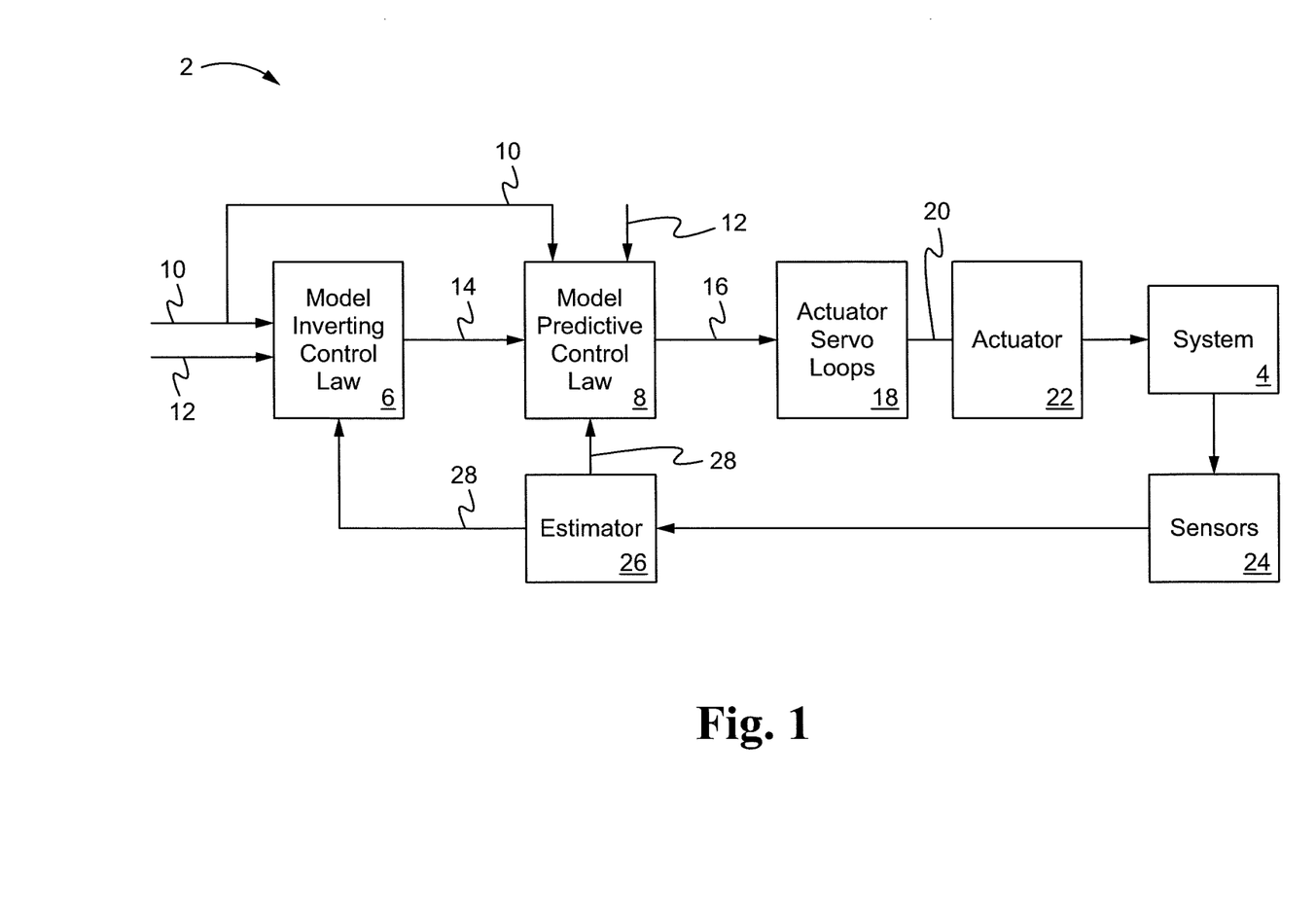
FIG. 1 is a schematic block diagram of a hybrid control system, in accordance with at least some embodiments of the present disclosure.

Referring now to FIG. 1, a schematic block diagram of an exemplary hybrid control system 2 is shown, in accordance with at least some embodiments of the present disclosure. As shown, the hybrid control system 2 is intended to control and predict the operating behavior of a system 4. In at least some embodiments, the system 4 may be any of a variety of physical or dynamic system or plants, such as, an aircraft engine, turbine or any component thereof, a chemical process, etc., that may utilize one or more control laws (e.g., the model inverting control laws, the model predictive control laws and/or the linear quadratic control Gaussian laws) for predicting, modeling and/or controlling system behaviors. The hybrid control system 2 may utilize a model inverting control (MIC) system 6 and a model predictive control (MPC) system 8 to predict, control and model the behavior of the system 4.

Specifically, the MIC system 6 may receive as inputs electronic commands (also referred to herein as simply commands or goals) 10 and limits 12 and output active goals and limits 14, which may then be input into the MPC system 8 along with the commands and limits to produce one or more effector requests 16. The MIC system 6 and the MPC system 8 are described in greater detail below with respect to FIGS. 2 and 3, respectively.

In accordance with at least some embodiments of the present disclosure, the commands 10 may signify the goal or output values of variables (e.g., behavior) that are desired to be manipulated or changed within the system 4. For example, one exemplary command may request changing the thrust level of the system 4 to forty thousand pounds (40,000 lbs). The above command may be implemented as a numerical, non-numerical or string value and may be input in the form of an electronic signal into the MIC system 6. Relatedly, the limits 12 may be the maximum values of various variables within the system 4 that must be observed. For example, the limits 12 may state a maximum safe operating temperature of the system 4, minimum and maximum thrust level, a minimum and maximum fan operating speeds, etc. Similar to the commands 10, the limits 12 may be implemented as an electronic signal in the form of numerical, non-numerical or string values. Furthermore, one or both of the commands 10 and the limits 12 may be manually input into the MIC system 6 by a human operator or they may be automatically generated based upon the current state of the system 4 and any pre-programmed desired future states of the system.

Accordingly, the MIC system 6 may take the commands 10 and the limits 12 and determine whether the commands 10 may be met or not in view of the current state of the system 4 while holding (e.g., observing) the limits. Generally speaking, tracking the commands 10 may not cause limited variables to exceed or go beyond the limits 12. Accordingly, the MIC system 6 may relax (e.g., make inactive) degrees of freedom of the commands 10, if needed, to remain within the limits 12 taking into account the relative priority (or weight) of the goals and the present state of the system 4, which as described below, is also input into the MIC system, and output the adjusted commands or goals as the active goals and limits 14 for one controller update ahead. Thus, the limits 12 have a higher priority than the goals specified in the commands 10.

These active goals and limits 14 may then be input into the MPC system 8 to convert the requested (or adjusted) goals into the effector requests 16, or in other words, the MPC system may translate the active goals and limits 14 into a form (e.g., a numerical form implemented as an electronic signal) by which the requested change may be facilitated. The MPC system 8 may predict the effector requests up to several controller updates ahead. The effector requests 16 may then be input into an actuator servo loop block 18, which may then utilize the effector requests to generate actuator commands 20 for controlling one or more actuators 22. The actuators 22, which may be physical devices or elements (such as valves) within the system 4, may take the actuator commands 20 and turn them into physical forces for manipulating the system (e.g., change the thrust level of the system to the value specified in the effector requests 16 and the actuator commands 20).

The MPC system 8 may iterate the computation solution many times (e.g., twelve to thirty times) in what may, effectively, be a search for a set of active goals and limits. In conventional MPC approaches, the set of active goals and limits is not known in advance. This may be a source of a high computational burden in the MPC system 8 where the active set (of goals and limits) may vary with each of N time steps of the planning horizon. Accordingly, the present disclosure provides a mechanism to eliminate the aforementioned iterative search, performing only one set of computations, by using the active goals and limits 14 received from the MIC system 6 for each time step, thereby also alleviating significantly the computational burden of the MPC system 8 while retaining many (if not all) of the advantages of the MPC system.

One or more sensors 24, for example, temperature sensors, pressure sensors, etc., may also be utilized to better determine the current state of the system 4. The sensors 24 may provide feedback to an estimator 26. The estimator 26 may adjust the predictions of the onboard models based on readings of the sensors 24 and account for a specific instance of the system 4 (e.g., different engines may have different operating values) and provide feedback to the MIC and MPC systems 6 and 8, respectively, to determine the next set of the commands 10 and the effector requests 16 based upon the current state of the system 4 via link 28, which is then input into the MIC and the MPC systems. Various designs of the estimator 26 are well known in the art and, accordingly, they have not been described here in detail for conciseness of expression. Generally speaking, any of a variety of estimators that may be suitable for use with the MIC and the MPC systems 6 and 8, respectively, may be employed for purposes of this disclosure.

Similar to the commands 10 and the limits 12, each of the active goals and limits 14, the effector requests 16 and the actuator commands 20 may be electronic signals that may be represented in numerical, non-numerical or string values. Furthermore, each of the MIC system 6, the MPC system 8, and the actuator servo loop block 18 may be implemented as control software within a computer system (not shown). The computer system may be an embedded or general purpose computer system. In at least some embodiments, the computer system may include a variety of volatile or non-volatile memory/storage devices, such as, flash memory, read only memory (ROM), programmable read only memory (PROM), erasable programmable read only memory (EPROM), electronically erasable programmable read only memory (EEPROM), etc., processing devices and units, and computer readable media, such as, joy sticks, flash drives, optical disc drives, floppy discs, magnetic tapes, drums, cards, etc. Other types of computing, processing as well as reporting and storage devices may be present within (or used in conjunction with) the computer system. Moreover, each of the MIC system 6, the MPC system 8 and the actuator servo loop block 18 may be implemented within a single computer system, or alternatively, one or more of those systems or parts thereof may be implemented on multiple computer systems in communication with one another.

Figure 2:
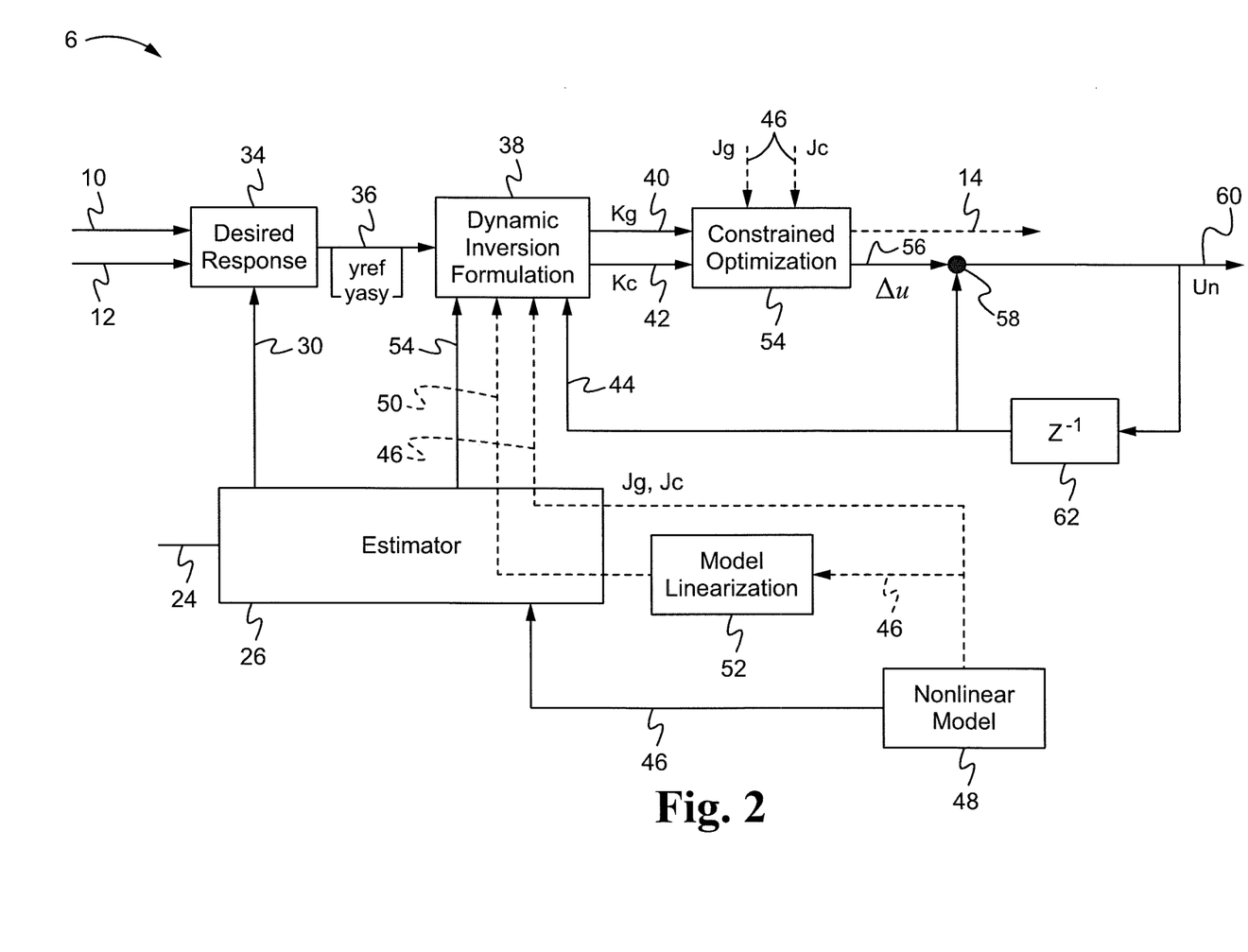
FIG. 2 is a schematic block diagram of a model inverting control system for use within the hybrid control system of FIG. 1, in accordance with at least some embodiments of the present disclosure.

Referring now to FIG. 2, an exemplary block diagram of the MIC system 6 is shown in greater detail, in accordance with at least some embodiments of the present disclosure. The objective of the MIC system 6 is to facilitate the desired response to the commands 10 (e.g., inputs) as well as possible, while holding all of the limits 12. Various approaches for designing the MIC system 6 are well known in the art. For conciseness of expression, only one approach, namely a constrained dynamic inversion (CDI) approach, which is also well known, has been described briefly in the present disclosure. However, it will be understood that other approaches may be employed as well for purposes of the present disclosure.

As shown, the MIC system 6 may receive as inputs the desired changes in goal variables in the form of the commands 10 and the maximum values for the goal variables as the limits 12. The commands 10 may be represented by a variable Ycmd and the limits 12 may be represented by a variable Ymax. The MIC system 6 may also receive one or more feedback signals 30 from a previous update, $yr_n$, from the estimator 26.

The commands 10, the limits 12 and the feedback signals 30 may first be processed within a desired response block 34 to express the commands as a desired response or reference signal (yr) 36 using a desired dynamic response model of the system 4. The desired response or reference signal (yr) 36 may provide the goal values (e.g., adjusted desired response values) one or more time steps into the future and whether they are actively tracking the goal or approaching the limit. Thus, the desired response block 34 may provide both: desired responses to changing commands or limits and desired transition dynamics toward the commands 10 and the limits 12 after the goal or limit has been inactive for a period. In essence, the desired response block 34 may compute $$\Delta yr_{n+k} \equiv \min\left\{-\sum_{l=1}^{k-1} B_l \cdot \Delta yr_{n+l} + B_0 \cdot \left\{\begin{bmatrix} Ycmd \\ Ymax \end{bmatrix}_n - \hat{y}_n\right\}, RL\right\}$$

$$yr_{n+1} = \Delta yr_{n+1} + yr_n$$

$$yr \equiv \begin{bmatrix} yref \\ yasy \end{bmatrix}$$

Where n signifies the current time step, k are integers greater than 1 representing future controller updates;
$\Delta yr_{n+1}$ is the change from $yr_n$ to $yr_{n+1}$;
$\hat{y}_n$ is an estimate of the reference signal (yr) 36;
B's are coefficients chosen by the designer, by known methods, to adjust the desired response dynamics;
RL are rate limits in the desired response which may be included;
yref is a subset of the vector yr pertaining to the desired response for tracking goals; and
yasy is a subset of the vector yr pertaining to the fastest desired approach of a limited variable to its limit which smoothes the transition between inactive and active which may be desirable for a number of reasons.

The desired response (yr) 36 may then be input into a dynamic inversion formulation block 38 that may determine an equality equation involving Kg 40 for each goal variable (as represented by the commands 10) and an inequality equation involving Kc 42 for each of the limits 12. In addition to the desired response (yr) 36, the dynamic inversion formulation block 38 may also receive as inputs effector requests from a last controller update ($u_{n-1}$) 44, outputs 46 from a non-linear model block 48, outputs 50 from a model linearization block 52 and biases ($\hat{\sigma}_n$) 54 from the estimator 26. Specifically, the dynamic inversion formulation block 38 may determine current effector commands that may cause the next outputs, $y_{n+1}$, as predicted by an onboard model, to match their associated reference values. Here, a nonlinear algebraic equation to be solved may be linearized about the prior effector setting, to facilitate solution. Those skilled in the art may realize that linearization may be about any effector value that is expected to be close to the eventual solution.

The CDI control law design and evaluation may be generally based on a nonlinear model. The nonlinear model may be implemented onboard (e.g., as part of the MIC system 6 itself) within the nonlinear model block 48 and may be used to make various predictions concerning the next controller update. The non-linear model may take the following form:

$$x_{n+1} = f(\hat{x}_n, u_n, w_n, p_n, d_n)$$

$$y_{n+1} = h(\hat{x}_{n+1}, u_n, w_n, p_n, d_n)$$

where f and h are nonlinear functions, $y_{n+1}$ is the predicted next output vector corresponding to feedback signals, goals, and limits for the next controller update, $x_{n+1}$ is the predicted next state, $u_n$ are effector requests that will be set by CDI, $w_n$ are other known inputs, $p_n$ are environmental parameters and $d_n$ are nominal or average values of unknown disturbances. The vectors $x_n$, $u_n$, $w_n$, $p_n$, and $d_n$ may be assumed to be independent of each other and the system dynamics may be nonlinear, time-varying, stochastic, and multivariable, with cross-coupled responses.

The outputs 46 from the non-linear model may then be employed to linearize the non-linear model within the model linearization block 52 about a reference effector signal, as follows:

$$x_{n+1} \cong f(\hat{x}_n, u_{n-1}, w_n, p_n, d_n) + Jx \cdot \Delta u_n$$

$$y_{n+1} \cong h(\hat{x}_{n+1}, u_{n-1}, w_n, p_n, d_n) + Jy \cdot \Delta u_n$$

where the original nonlinear functions f and h have been linearized about the last effector signal.

d is the average or otherwise nominal value for the unknown disturbance $\hat{x}$ is the estimate of the state $$\Delta u_n = u_n - u_{n-1},$$

$$Jx = \frac{\partial f}{\partial u}$$

and $$Jy = \frac{\partial h}{\partial u} + \frac{\partial h}{\partial x} \cdot Jx$$

$$Jy = \begin{bmatrix} Jg \\ Jc \end{bmatrix}$$

Where Jy is a sensitivity matrix and may be partitioned into a submatrix Jg pertaining to goal sensitivity and a submatrix Jc pertaining to limit sensitivity.

Furthermore, the linearized equations may be combined with signals from the link 28 from the estimator 26 to improve accuracy. This may have the following form as computed by the dynamic inversion formulation block 38:

$$\hat{y}_{n+1} = y1 + \hat{\sigma}_n + Jy \cdot \Delta u$$

where $$x1_{n+1} = f(\hat{x}_n, u_{n-1}, w_n, p_n)$$

$$y1 = h(x1_{n+1}, u_{n-1}, w_n, p_n)$$

$$Jy = \frac{\partial h}{\partial u} + \frac{\partial h}{\partial x} \frac{df}{du}$$

and $$\Delta u = u - u_{n-1}$$

A hat "^" over a symbol indicates an estimate of its value and $\hat{\sigma}_n$ is a bias estimate produced by the estimator to account for current model error. Furthermore, the above determination of x1 and y1 may be similar to the equations propagating the nonlinear model block 48, except that $u_{n-1}$ may be used in place of the yet to be determined $u_n$. The linearized model equations may thus be algebraically manipulated to support determination of a change ($\Delta u$) that may make the one step ahead predicted values, $y_{n+1}$, equal to the associated reference values, $yr_{n+1}$, for the active goals and limits. Isolating the effector perturbation on the left hand side of the above equation:

$$Jy \cdot \Delta u = K$$

where $$K = yr_{n+1} - [h(x1_{n+1}, u_{n-1}, w_n, p_n) + \hat{\sigma}_n]$$

Although the above equations contain all the goals and limits, they may only be solved for active limits and goals. An optimization procedure may determine which of the goals 10 and the limits 12 are active. To support this optimization, J and K may be segregated into distinct terms for goals (g), and limits (c) as follows:

$$\begin{bmatrix} Kg \\ Kc \end{bmatrix} = K$$

and $$\begin{bmatrix} Jg \\ Jc \end{bmatrix} = Jy$$

It will also be understood that while the above equations make a prediction for the next controller update in one step ahead, in at least some embodiments, the equations may be set up to predict at some steps further into the future, in a known manner.

The variables Kg 40 and Kc 42, along with the outputs 46 may then be input into a constrained optimization block 54. The constrained optimization block 54 may provide a solution for an optimization problem, thereby determining which constraints are active, which goals are relaxed, the prioritization of constraints in infeasible cases and effector commands by solving a matrix equation for $\Delta u$. The optimization problem may be specified within the constrained optimization block 54 to determine a performance index (PI) as follows:

$$\min_{\Delta u} PI = \frac{1}{2} \|Jg \cdot \Delta u - Kg\|_Q^2 + \frac{1}{2} \|\Delta u\|_R^2$$

subject to $Jc \cdot \Delta u \leq Kc$

The performance index may be defined as the weighted square of the error in the goal equation and perhaps a weighted square of the effector change. Q in the above equation is the goal weighting matrix and R is the effector change weighting matrix. R weights are usually chosen to be smaller than Q. Determination of the $\Delta u$ that produces the minimum value of the performance index is a quadratic programming (QP) type of optimization problem, which is well known in the art. QP may be implemented with well known quadratic programming algorithms, such as active set and interior point methods. The QP problem has two components: goal equality equation in the form of performance index, PI, and the limit equations in the form of inequality constraints. The minimum possible value of PI is zero (or no error), which may be achieved when the goal equation is exactly solved.

Furthermore, if the limits are active, it may be necessary to relax certain goal equations in favor of holding the active limits. As is known, the weights in matrix Q may be varied to change the relative goal priorities and thus to change which goal degrees of freedom are relaxed. A small R weight may be included in the PI determination in order to improve the robustness to model uncertainty. The solution to the QP optimization problem may provide the active goals and limits 14, which may then be employed within the MPC system 8, as described below in FIG. 3. The current effector request 56 may then be combined with the effector requests from the last controller update 44 within a summation block 58 to obtain a current MIC effector request ($u_n$) 60. The current MIC effector request 60 or the current (MPC) effector request 16 (not shown) may also be delayed by one step within a memory unit 62 to obtain the effector request in the last controller update 44.

Figure 3:
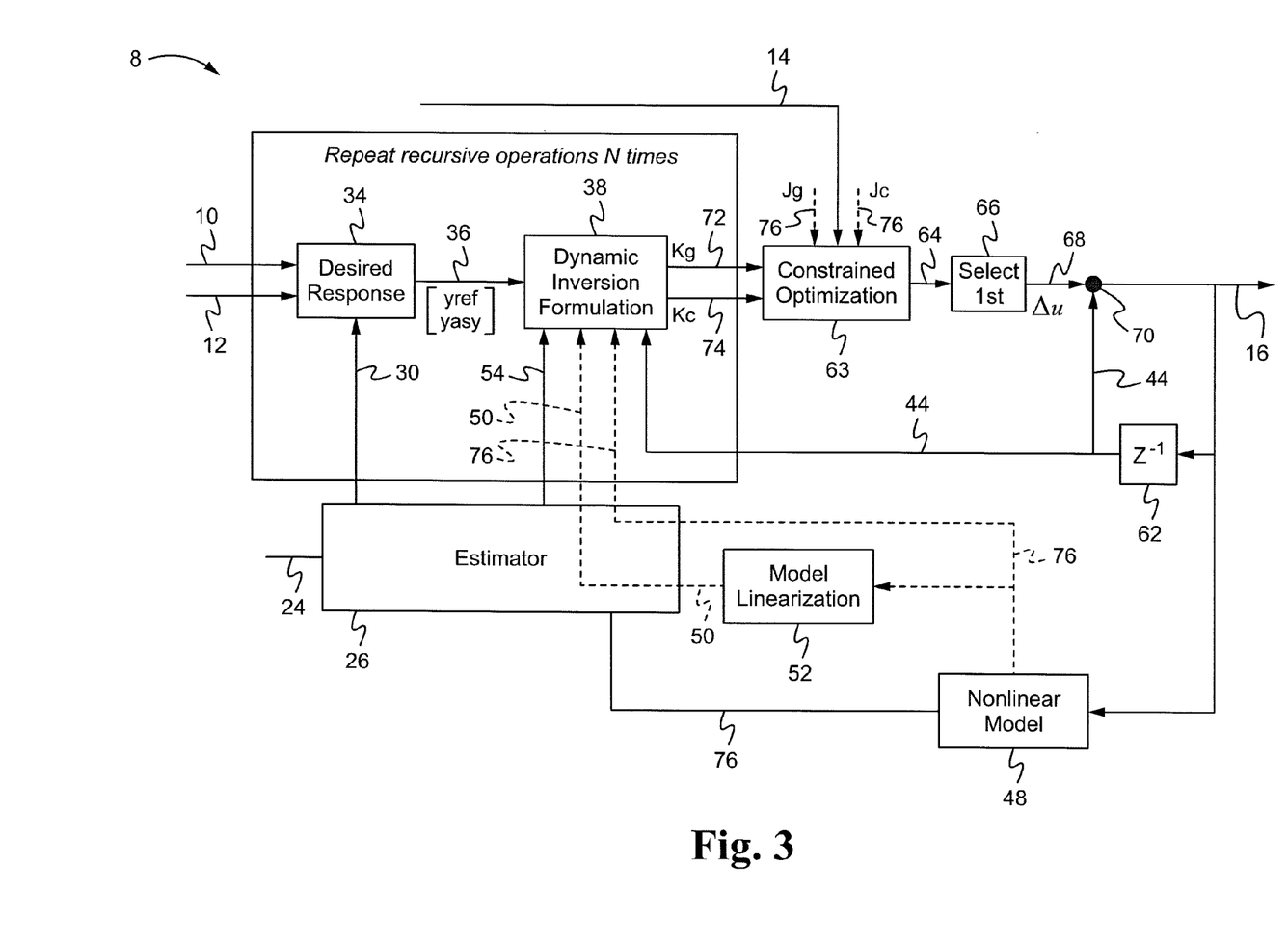
FIG. 3 is a schematic block diagram of a model predictive control system for use within the hybrid control system of FIG. 1, in accordance with at least some embodiments of the present disclosure.

Referring now to FIG. 3, an exemplary one of the MPC system 8 is shown, in accordance with at least some embodiments of the present disclosure. The MPC system 8 receives the same inputs (the commands 10, the limits 12, estimator signals and feedback signals 30) as the MIC system 6 within the desired response block 34. The desired response block 34 recursively operates on the input signals N times to generate an output 78. The output 78 is similar to the output 36 of the MIC system 6, but it differs therefrom in that the dimensions of the output 78 are N times larger in the MPC system 8 (e.g., one entry for each step). The output 78 may then be input into the dynamic inversion formulation block 38, which generates output signals 72 and 74, both of which are N times larger than the corresponding outputs 40 and 42, respectively.

Thus, generally speaking, the MPC system 8 is similar to the MIC system 6, with certain distinctions. For example, whereas the MIC system 6 predicts effector requests (e.g., the current MIC effector request 60) based on optimization including only one controller update ahead, the MPC system 8 predicts N effector settings based on an optimization spanning N steps ahead. Further, while the MPC system 8 processes the commands 10, the limits 12 and the feedback signals 30 within the desired response block 34, and the dynamic formulation block 38 in a manner similar to that of the MIC system 6 described above, in contrast to the MIC system which is executed only once for one future controller update, computations in the dynamic response block and the dynamic inversion formulation block of the MPC system may be recursively repeated N times (for predicting N steps ahead) to produce desired goal and limit references for N different time points into the future and the outputs may be N times larger than the corresponding outputs of the MIC system 6. The MPC system 8 also follows the same (or similar) non-linear model 48 and the model linearization 52 as that of the MIC system 6.

However, due to the recursive or iterative computation of the MPC system 8, the implementation of the MPC system 8 requires substantially more computation conventionally. As in the MIC system 6, the QP solver of the MPC system 8 performs the iterations. Each is more computationally intensive than each MIC iteration. As the QP solver iterates, it is in effect searching for the active limits and goals that minimizes PI while meeting all limits. In general the active set can differ in each of N steps. Ten to thirty (10-30) iterations are common. However, by utilizing the present disclosure, the iterative search is eliminated, saving much computation, by utilizing the active goals and limits 14 generated by the MIC system 6 at each of the N steps and using that to solve the optimization problem within a constrained optimization block 63 of the MPC system 8. The ten to thirty (10-30) iterative computations may thus be cut down to one single computation.

Similar to the constrained optimization block 54 of the MIC system 6, the constrained optimization block 63 of the MPC system 8 receives the outputs 72, 74 from the dynamic inversion formulation block 38 and outputs 76 from the non-linear model block 48. The outputs 72, 74 and 76 are similar to the corresponding outputs 40, 42 and 46, respectively, of the MIC system 6, but they are N times larger to cover N steps rather than just a single step. In addition, the constrained optimization block 63 also receives the active goals and limits 14 generated by the MIC system 6, which enables reduction of computation within the MPC block. The optimization problem within the constrained optimization block 63 may be solved using a single iteration of a quadratic programming (QP) method. Other methods may also be used when the active limits are given a priori, because the many inequality constraints may be replaced by a few equality constraints. One option for solving the optimization problem within the constrained optimization block 63 is the interior point method. In this method the inequality constraints are adjoined to the performance index so the optimization problems becomes $$\min_{\Delta u} PI = \sum_{p=n}^{N+n-1} \frac{1}{2}\|Jc \cdot \Delta u_p - Kc_{p+1}\|_T^2 + \frac{1}{2}\|Jg \cdot \Delta u_p - Kg_{p+1}\|_Q^2 + \frac{1}{2}\|\Delta u_p\|_R^2$$

where the new weighting matrix T is a square diagonal matrix with same dimensions as the number of limits times the number of time points N, whose diagonal elements are either approximately zero, if the associated limit is not active at the associated time step, or a large positive number, if the associated limit is active. The iterations of the quadratic programming problem may determine the values of T in common MPC implementations. For example, the active goals and limits 14 from the MIC system 6 may be used to set corresponding T diagonal elements to a large number for all N steps. Otherwise the elements are set to zero. Furthermore, the optimization problem no longer has the inequality constraints. Rather the active limits appear in the performance index in the form of additional goals with very high or zero weights in an unconstrained optimization (inactive limits may also appear but with zero weight and thus can be dropped). The interior point method may find the optimal solution in one iteration. Since no iterative search is required many methods of computational optimization are applicable.

Accordingly, if the active set (e.g., the active goals and limits 14) is known, the MPC system 8 may be modified to require only one iteration. In this case, the matrix T, may be set as follows:

$$T(i, i) = \begin{cases} \text{big number,} & \text{if } i \text{ is the index of an active limit} \\ 0, & \text{if } i \text{ is the index of an inactive limit} \end{cases}$$

It will be understood that if the optimization problem within the constrained optimization block 63 for the MPC system 8 is computed for an infinity number of controller steps ahead and no limits are active, then the Linear Quadratic Gaussian (LQR) described above, may be employed for solving the optimization problem.

Outputs 64 (e.g., solutions of the optimization problem) from the constrained optimization block 63 may provide predicted change in effector requests (Δu) for N controller updates ahead. A first (e.g., next controller update) one in line of those outputs 64 may be selected by a select first block 66 and be output as effector request change (Δu) 68 from the effector request from last controller update 44. The effector request change 68 may then be combined with the effector request from the last controller update 44 in a summation block 70 to obtain the effector requests 16, which as described in FIG. 1, may be employed for controlling the actuator servo loop block 18.

INDUSTRIAL APPLICABILITY

In general, the present disclosure sets forth a hybrid control system that utilizes a model inverting control law and a model predictive control law to control and predict system behaviors. Specifically, the present disclosure utilizes a model inverting control law (e.g., the CDI control law) planning to hold limits, as well as to track goals and further determine which limits are active and generate an active set of goals and limits, which is then used to implement the more dynamically robust model predictive control law in a single iteration, to greatly reduce computation.

Advantageously, the above described hybrid control system may be configured so that in the MPC system, there are no inequality constraints, it receives the set of active goals and limits from the model inverting control system and the goals are replaced by a combination of the active goals and limits. These modifications greatly reduce the amount of computation (e.g., by around ninety to ninety five percent) needed to implement the modified model predictive control system, which in turn can be employed for predicting and controlling system behaviors of those systems that undergo frequent updates. By choosing a sufficiently large N, the hybrid controller no longer requires the system to be controllable in one step, is more tolerant of model uncertainty, and can tolerate systems that are unstable and/or NMP. This increased robustness can be exploited to ease design effort, make it more feasible to change the goals and limits, enable linearization on the fly, and adapt or otherwise modify the onboard after control law design.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A hybrid control system for predicting a behavior of a physical system, the hybrid control system comprising:
   a model inverting control system configured to receive commands associated with the physical system, capable of implementing a model inverting control law, and configured to determine an active set of goals and limits based on the electronic commands associated with the physical system;
   a model predictive control system capable of implementing a model predictive control law and configured to utilize the active set of goals and limits to determine current effector requests;
   an actuator servo loop capable of converting the current effector requests into actuator commands;
   an actuator capable of receiving the actuator commands and controlling a behavior of the physical system; and
   an estimator capable of providing feedback to the model predictive control system and the model inverting control system.

2. The hybrid control system of claim 1, wherein the actuator servo loop is configured to receive the current effector requests from the model predictive control system and generate the actuator commands.

3. The hybrid control system of claim 2, further comprising a plurality of actuators that are configured to receive the actuator commands and manipulate the behavior of the physical system.

4. The hybrid control system of claim 1, further comprising one or more sensors capable of determining a current state of the physical system.

5. The hybrid control system of claim 1, wherein the estimator is configured to receive information from one or more sensors of the physical system and configured to provide feedback to the model predictive control system and the model inverting control system based upon a current state of the physical system.

6. The hybrid control system of claim 1, wherein the model inverting control system is configured to receive one or more commands and one more limits as inputs.

7. The hybrid control system of claim 1, wherein the model inverting control system is configured to implement a constrained optimization to predict one future controller update.

8. The hybrid control system of claim 1, wherein the model predictive control system is configured to implement a constrained optimization to predict a plurality of future controller updates.

9. The hybrid control system of claim 8, wherein the model predictive control system is configured to predict the plurality of future controller updates in a single iteration.

10. The hybrid control system of claim 8, wherein the constrained optimization is configured to utilize the active set of goals and limits from the model inverting control system to predict the plurality of future controller updates.

11. The hybrid control system of claim 1, wherein the model inverting control law is a constrained dynamic inversion control law.

12. The hybrid control system of claim 1, wherein the physical system is an engine.

13. A method for predicting behavior of a physical system, the method comprising:
   receiving one or more electronic commands associated with the physical system or limits associated with the physical system as inputs;
   determining by a model inverting control system an active set of goals and limits based upon the one or more electronic commands associated with the physical system or limits associated with the physical system;
   inputting the active set of goals and limits along with the one or more commands and limits into a model predictive control system;
   computing current effector requests based upon the active set of goals and limits for controlling behavior of the physical system;
   converting, using an actuator servo loop, the current effector requests into an actuator command;
   receiving the actuator command at an actuator;
   controlling, using the actuator and actuator command, a behavior of the physical system; and
   providing feedback, using an estimator, to the model predictive control system and the model inverting control system.

14. The method of claim 13, wherein computing the current effector requests comprises performing a constrained optimization in a single iteration.

15. The method of claim 13, wherein the actuator servo loop receives the current effector requests from the model predictive control system and generates one or more actuator commands.

16. The method of claim 15, further comprising a plurality of actuators for receiving the one or more actuator commands and manipulating the behavior of the physical system.

17. The method of claim 13, further comprising determining a current state of the physical system for determining the active set of goals and limits and the current effector requests.

18. A hybrid control system, comprising:

a model inverting control system capable of receiving one or more commands and limits and generating an active set of limits and goals;

a model predictive control system capable of receiving the one or more commands and limits and the active set of goals and limits to generate current effector requests in a single iteration;

an actuator servo loop capable of converting the current effector requests into actuator commands;

one or more actuators capable of receiving the actuator commands and controlling a behavior of a physical system; and an estimator capable of providing feedback to the model predictive control system and the model inverting control system.

19. The hybrid control system of claim 18, wherein the model predictive control system determines a performance index that utilizes a diagonal weighting matrix T to determine the current effector requests.

20. The hybrid control system of claim 19, wherein elements of the diagonal weighting matrix T are big numbers if a corresponding limit is active and the elements are zero if the corresponding limit is inactive.

* * * * *